Feb. 4, 1947.  T. B. ALLARDICE  2,415,270
CROSS CHAIN FOR AUTOMOBILE TIRE CHAINS
Filed March 26, 1945  2 Sheets-Sheet 1
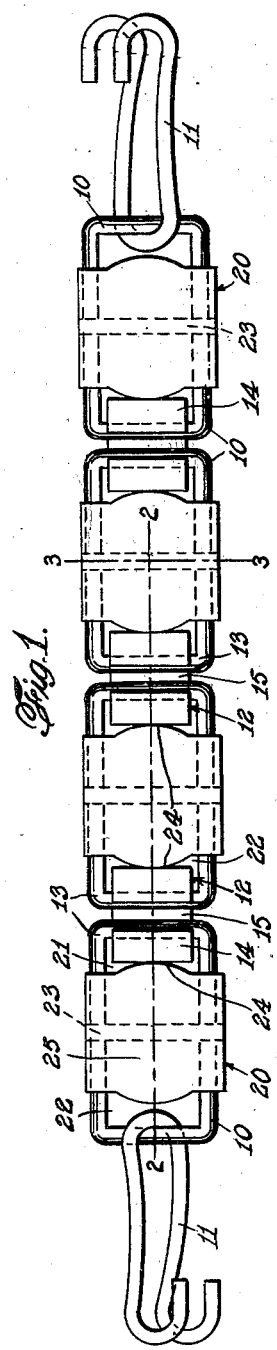
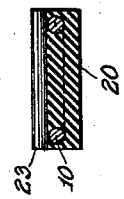
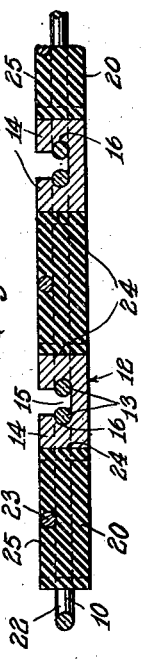
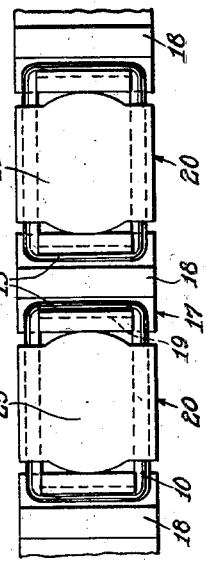
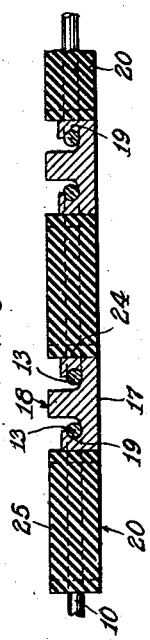
INVENTOR.
THOMAS B. ALLARDICE
BY
ATTORNEY.

Feb. 4, 1947. T. B. ALLARDICE 2,415,270
CROSS CHAIN FOR AUTOMOBILE TIRE CHAINS
Filed March 26, 1945 2 Sheets-Sheet 2
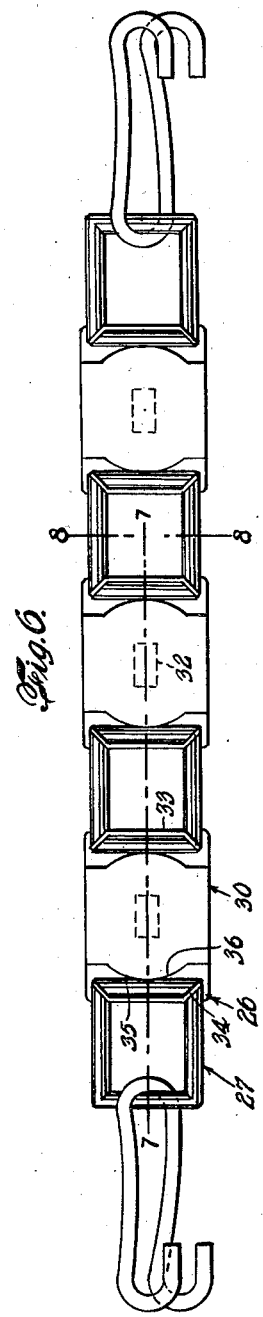
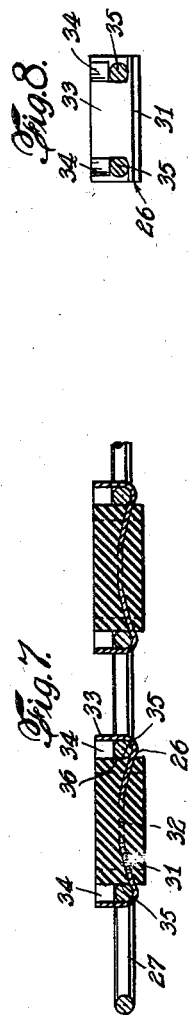
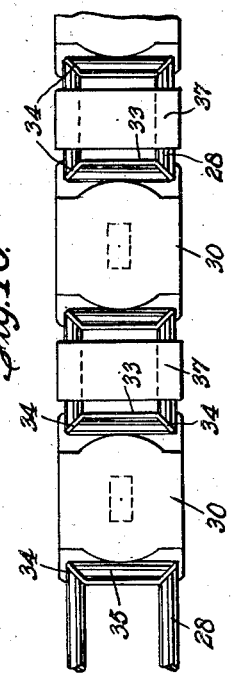
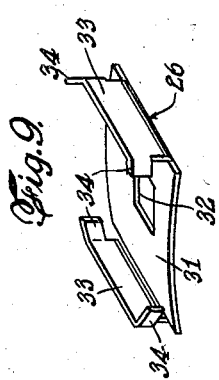
INVENTOR.
THOMAS B. ALLARDICE
BY
ATTORNEY.

Patented Feb. 4, 1947

2,415,270

UNITED STATES PATENT OFFICE 2,415,270

CROSS CHAIN FOR AUTOMOBILE TIRE CHAINS

Thomas B. Allardice, Mountain Lakes, N. J.

Application March 26, 1945, Serial No. 584,874

9 Claims. (Cl. 152—245)

1

The invention relates to anti-skid chains such as are used in connection with rubber-tired motor-driven vehicles, and more particularly to a cross chain assembly thereof.

It is an object of this invention to provide a cross chain which will present both a metal and a rubber tread surface, the rubber tread surface not only making for quieter running but materially prolonging the life of a cross chain.

Another object of the invention is to provide simple and readily manufactured elements for constructing the novel cross chain.

Still another object of the invention is to provide elements which may readily be interlocked to form the cross chain.

A further object of the invention is to provide interlocking members which may be expeditiously repaired and replaced.

A still further object of the invention is to provide cross chain members, for use on automobile tires, which will be effective in preventing skidding of an automobile equipped therewith, and which afford dependable and effective traction under otherwise severe and dangerous conditions.

In carrying out the invention, there is provided a succession of metal link members which are connected to one another to provide a cross chain adapted to be inserted between the conventional circumferential side chains. The connection between individual link members is effected by means of readily manufactured elements in the nature of a metal block with transverse groove or channel between its ends which are undercut transversely, or in the nature of a stamping having its ends upturned and provided with lateral ears bent inwardly over the body portion of the stamping.

The juxtaposed link member ends are designed to fit pivotally the undercuts of a block or beneath the inwardly bent portions of the ends of the stamping; and provision is made to maintain these pivotal connections, for example, by means of a block of resilient and wearing material such as rubber, which blocks are held by the respective link members or by the stampings in casting the same thereover. Or, the blocks may be retained by both link members and stampings, if desired. Each rubber block is provided with outwardly extending projections at its opposite ends to contact respective end portions of a metal block or link end and to exert sufficient pressure to maintain the interlocking relationship.

The nature of the invention, however, will best be understood when described in connection with the accompanying drawings, in which:

2

Fig. 1 is a plan view of a cross chain and shows one embodiment of the invention.

Fig. 2 is a longitudinal section therethrough taken on the line 2—2, Fig. 1 of the drawings.

Fig. 3 is a transverse section taken on the line 3—3, Fig. 1 of the drawings.

Figs. 4 and 5 are fragmentary views, respectively in longitudinal section and in plan, illustrating a modification in a connecting member of the cross chain.

Fig. 6 is a plan view showing another embodiment of the invention.

Fig. 7 is a longitudinal section therethrough taken on the line 7—7, Fig. 6 of the drawings.

Fig. 8 is a transverse section taken on the line 8—8, Fig. 6 of the drawings.

Fig. 9 is a perspective view of the stamping forming a part of a connecting member of the embodiment illustrated in Figs. 6 to 8, inclusive.

Fig. 10 is a fragmentary plan view illustrating a modification in the type of cross chain shown in Figs. 6 to 8, inclusive.

Referring to the drawings, more particularly Figs. 1 to 3, the novel cross chain is shown as made up of a number of elongated and more or less rectangularly shaped link members 10 of suitable metal for tread purposes, the end ones of which link members are to be secured to the conventional circumferential and parallel side chain elements (not shown) in the usual manner, for example, by means of auxiliary connecting links or hooks 11, pivotally attaching a cross chain to its side chains. The various link members 10 are juxtaposed lengthwise with adjacent ends slightly separated to allow of freedom of movement transversely of the tread of a tire (not shown) and which the chains are adapted to span in the usual manner, the proper number of link members being pivotally joined or interlocked to conform to the particular size and crown or tread of tire to which a chain is to be applied. In some instances only one pair of links with intermediate connecting member will suffice.

The novelty of the present invention resides in this interlocking of the link members to provide a continuous and flexible cross chain section and is accomplished as follows. Intermediate connecting members such as the metal block elements 12 alternate with and are located to this end between the respective juxtaposed ends of the link members. These connecting members are so constructed as to overhang the end portions or cross rods 13, of circular section, of a link member.

To admit a link member and in assembling the cross chain, as well as to provide for proper pivoting or hinging action between a connecting member and its associated link member ends, these connecting members are open at the top as in being transversely channeled or grooved over the upper face and substantially midway of their ends 14, as at 15. These ends in turn along the inner lateral faces of the channel 15 are transversely undercut or bored to substantially a semi-circular contour as at 16 and are designed to receive a corresponding cross rod 13 of the juxtaposed end of a link member, which may thus rock therein as in a bearing and allow of conforming the cross chain as a whole transversely about the tire periphery.

Or, as indicated in Figs. 4 and 5, the interconnecting members 17 shown may be formed with an intermediate metal top tread portion 18 and with the respective ends depressed below the top of tread 18, the undercut bearing sockets 19 being provided in said ends as in the case of the previously described embodiment.

To prevent separation of the successive link members as thus pivotally interlocked, provision must be made against endwise displacement of a connecting block element 12 or 17 relatively to a cross rod 13 socketed therein. To this end, there is secured to the various link members a resilient block element 20, as of rubber or the like, which occupies a substantial portion of the internal area between the end cross rods of a link member but leaves sufficient space remaining upon opposite sides, as at 21 and 22, to admit the connecting member ends, and in the case of the final link members to admit the connecting hooks 11, the latter to have free play therein. The connecting members 12 or 17, however, are to be resiliently held in position by the different resilient blocks 20 which may be fixed to a corresponding link member by being cast thereover in initially constructing such link member. It is preferred, also, to provide a reinforcing member 23 across the individual link members, for example, by securing the same thereto at the top. This will hold better the rubber element 20 with which the top surface of a member 23 is, preferably, made to lie substantially flush to afford additional metallic tread surface.

Each resilient insert block is provided with a pair of projections or bulges 24 located respectively at the opposite ends and adapted for contacting a juxtaposed overhanging end of a connecting member. These resilient inserts thus afford compression members and over the end projections of which the abutting connecting member ends may be forced in assembling a cross chain, a cross rod or end 13 of a link member slipping into the corresponding undercut or socket portion 16 or 19. These inserts will serve then to maintain the interlocking relationship of said link members and connecting members. By slacking the entire chain, the projections 24 may be manually compressed sufficiently to provide ample clearance so that the link members may be separated and withdrawn from the connecting members, in case of replacement or repair.

The upper and tread surface 25 of these rubber insert members are constructed to be flush with the corresponding wearing surfaces of the ends 14 or treads 18 of the connecting blocks so that the cross chains will present both a metal and a rubber tread surface.

In the modification illustrated in Figs. 6 to 9 of the drawings, members 26 connecting the link members 27 together are constructed of a stamping, shown more particularly in Fig. 9. In this embodiment, also, the connecting members, rather than the link members 27 as in the previously described embodiment, carry the resilient tread and contacting element 30. The bottom or body portion 31 of a stamping is preferably bowed upwardly, as shown, and is perforated as at 32 with the resilient material cast over both sides of said portion and through the said perforation therein. Its ends 33 are cut inwardly and upturned, and are provided at the top with lateral ears 34 which are bent inwardly over the bowed portion for accommodating and retaining beneath them the corresponding end cross rods 35 of the associated link members. These rods are then retained by means of their contact with end projections or bulges 36 of the resilient contacting element 30.

If desired, and as indicated in Fig. 10 of the drawings, resilient tread blocks 37 may also be secured to the link members 28 so that the cross chain presents a more or less continuous rubber tread with only a small proportion of metal surface as provided by the top surfaces of the upturned ends 33 and of the ears 34.

I claim:

1. The tire chain construction of claim 9, wherein a resilient block element is retained in each link member and has end projections contacting a corresponding face of the members and having end projections contacting a face of the end overhanging portions of a connecting member to exert pressure thereon and prevent disengagement of said connecting member with corresponding juxtaposed link member ends.

2. The tire chain construction of claim 9, wherein a resilient block element is retained in each of the connecting members and its end projections contact an inner face of the end overhanging portions of a connecting member.

3. The tire chain construction of claim 9, wherein the tops of the resilient block elements and the tops of the overhanging portions of the connecting members are flush with one another.

4. The tire chain construction of claim 9, wherein the tops of the resilient block elements and the tops of the overhanging portions of the connecting members are flush with one another, and a reinforcing transverse member is secured over the top of the link members substantially flush with both the said blocks and the tops of the overhanging portions of the connecting members.

5. The tire chain construction of claim 9, wherein the connecting members are metallic blocks with a transverse top groove and are undercut along the bottom of the sides of the groove to accommodate the juxtaposed ends of corresponding link members.

6. The tire chain construction of claim 9, wherein the connecting members are stampings having their ends upturned and provided with lateral ears bent inwardly over the body portion of the stamping to accommodate beneath the inwardly bent portions the juxtaposed ends of the corresponding link members.

7. The tire chain construction of claim 9, wherein the connecting members are stampings having their ends upturned and provided with lateral ears bent inwardly over the body portion of the stamping to accommodate beneath the inwardly bent portions the juxtaposed ends of the corresponding link members, and the resilient block elements are retained in the connecting members.

8. The tire chain construction of claim 9, wherein the connecting members are stampings having their ends upturned and provided with lateral ears bent inwardly over the body portion of the stamping to accommodate beneath the inwardly bent portions the juxtaposed ends of the corresponding link members, and the resilient block elements are retained in the connecting members and extend through a perforation of the body portion of a stamping over both sides of said portion.

9. In a tire chain construction: a cross chain for connection between circumferential side chain elements, comprising alternate metallic link members and intermediate connecting members pivotally joining juxtaposed ends of the said link members, said connecting members being open at the top to admit the juxtaposed ends and having inwardly directed portions overhanging the same, and a resilient block element retained in each member of one group of interconnected members and having end projections adapted to exert pressure upon a member of the other group of interconnected members to prevent disengagement of the two groups.

THOMAS B. ALLARDICE.

REFERENCES CITED

The following references are of record in the file of this patent:

UNITED STATES PATENTS

| Number | Name | Date |
| --- | --- | --- |
| 985,884 | Clark | Mar. 7, 1911 |
| 1,363,175 | Benoit | Dec. 21, 1920 |
| 1,838,127 | Anchors | Dec. 29, 1931 |